(12) United States Patent
Downing et al.

(10) Patent No.: US 7,524,398 B2
(45) Date of Patent: Apr. 28, 2009

(54) APPARATUS FOR MAKING TIRE COMPONENTS, AND A TIRE

(75) Inventors: Daniel Ray Downing, Uniontown, OH (US); James Alfred Benzing, II, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 241 days.

(21) Appl. No.: 11/240,429

(22) Filed: Sep. 30, 2005

(65) Prior Publication Data

US 2006/0137826 A1    Jun. 29, 2006

Related U.S. Application Data

(60) Provisional application No. 60/638,686, filed on Dec. 23, 2004.

(51) Int. Cl.
 *B65H 29/00* (2006.01)
 *B29D 30/00* (2006.01)
(52) U.S. Cl. .............. 156/405.1; 156/406.4; 156/406.6; 156/433; 156/436; 156/437; 156/439
(58) Field of Classification Search ................ 156/166, 156/167, 176, 177, 178, 179, 433, 436, 437, 156/439, 405.1, 406.4, 406.6
See application file for complete search history.

(56) References Cited

U.S. PATENT DOCUMENTS

| | | | | |
|---|---|---|---|---|
| 493,220 | A * | 3/1893 | Palmer ........................ | 428/107 |
| 3,240,250 | A | 3/1966 | Frazier ........................ | 152/354 |
| 3,421,958 | A * | 1/1969 | Gallagher .................... | 156/192 |
| 3,608,605 | A * | 9/1971 | Cole ........................... | 152/533 |
| 3,694,283 | A | 9/1972 | Cooper et al. ................ | 156/159 |
| 3,826,297 | A | 7/1974 | Alderfer ...................... | 152/354 |
| 3,888,713 | A | 6/1975 | Alderfer ...................... | 156/93 |
| 4,516,451 | A | 5/1985 | Takeshita et al. ............. | 83/171 |

(Continued)

FOREIGN PATENT DOCUMENTS

DE        28 05 870        8/1979

(Continued)

OTHER PUBLICATIONS

European Search Report, completed Apr. 5, 2006.

*Primary Examiner*—Justin Fischer
(74) *Attorney, Agent, or Firm*—June E. Rickey

(57) ABSTRACT

An apparatus for making a reinforced elastomeric fabric having a gauge thickness G and a cord spacing S, the apparatus comprising: a die having a plurality of holes for receiving a reinforcement cord, the holes providing a cord spacing of about S/2, a first and second calender roll located adjacent the die, the die having a end plate having a slot wherein the slot is located adjacent a calender roll so that the reinforcement cords are pressed into engagement with a ribbon of elastomeric material, the calender rolls being spaced to provide a gauge thickness of about G/2, the apparatus further comprising a cutter for cutting the ribbon of reinforced elastomeric material into segments having a length L, each segment having a width W, each segment having lateral edges, said apparatus further comprising a pick arm for placing a plurality of segments onto a conveyor so that the lateral ends of adjacent segments are lap spliced together, the lap splice having a width W/2.

5 Claims, 22 Drawing Sheets

U.S. PATENT DOCUMENTS

| | | | |
|---|---|---|---|
| 4,560,427 A | 12/1985 | Flood | 156/73.3 |
| 4,610,750 A | 9/1986 | Mango | 156/510 |
| 4,790,898 A * | 12/1988 | Woods | 156/166 |
| 4,920,495 A | 4/1990 | Pilkington | 83/956 |
| 4,922,774 A | 5/1990 | Oldeman | 83/175 |
| 4,987,808 A | 1/1991 | Sicka et al. | 83/175 |
| 5,265,508 A | 11/1993 | Bell et al. | 83/136 |
| 5,273,601 A | 12/1993 | Sergel et al. | 156/133 |
| 5,350,470 A | 9/1994 | Mochel et al. | 156/136 |
| 5,372,172 A | 12/1994 | Iseki | 152/548 |
| 5,480,508 A | 1/1996 | Manabe et al. | 156/353 |
| 5,587,030 A | 12/1996 | Herbelleau | 152/555 |
| 5,638,732 A | 6/1997 | Becker et al. | 83/461 |
| 5,746,101 A | 5/1998 | Benzing, II et al. | 83/34 |
| 5,762,740 A | 6/1998 | Benzing, II | 156/133 |
| 6,613,177 B1 * | 9/2003 | Suda et al. | 156/264 |
| 2002/0134481 A1 | 9/2002 | Abdallah, Jr. | 152/526 |
| 2003/0051794 A1* | 3/2003 | Suda et al. | 156/123 |

FOREIGN PATENT DOCUMENTS

| | | |
|---|---|---|
| EP | 0 444 573 A1 | 9/1991 |
| EP | 0 619 170 | 10/1994 |
| JP | 04131218 * | 5/1992 |
| WO | WO 00/23261 | 4/2000 |
| WO | WO 00/51810 | 9/2000 |
| WO | WO 2005/063506 | 7/2005 |

* cited by examiner

APPARATUS FOR MAKING TIRE COMPONENTS, AND A TIRE

This application claims the benefit of U.S. provisional application No. 60/638,686, filed Dec. 23, 2004.

FIELD OF THE INVENTION

The invention relates to an apparatus for making tire components, and more particularly to an apparatus for making ply for a tire.

BACKGROUND OF THE INVENTION

It is well known that the components of most pneumatic tire constructions must be assembled in a way, which promotes tire uniformity in order to provide optimum tire performance. Tire uniformity is generally considered to mean tire dimensions and mass distributions which are uniform and symmetric in all directions, so that there is static and dynamic balance of forces.

Although certain degrees of tire nonuniformity can be corrected in post assembly manufacturing, it is more preferable and more efficient to build a more uniform tire. Typically, tires are constructed on a tire building drum, around which the tire components are wrapped in successive layers such as an innerliner, one or more reinforced carcass plies, optional sidewalls, bead area inserts or apexes, sidewalls and bead wires. Typically, the innerliner and the ply layer are each wrapped around the drum and then the ends are cut and spliced together. Tire manufacturers typically strive to balance the splices around the tire to minimize tire nonuniformity.

Tire manufacturers typically make their own ply, wherein the ply is made from reinforcement filaments or cords, which are woven into a fabric wherein the cords run longitudinally along the length of the fabric. A pic cord runs across the width of the ply to maintain the spacing or epi (ends per inch) of the cords. This ply fabric is then coated with a rubber adhesive and calendered. The coated fabric is then sheared into discrete segments having a length matching the desired width needed to make a tire. The lateral edges of these segments are then spliced together, wherein the cords are transverse to the length of the spliced together segments. A plurality of segments is spliced together in order to achieve the necessary circumferential length needed for a specified tire. These preparatory splices typically overlap several cords, because the edges of the segments are not perfectly straight. Generally, there are two to three preparatory splices in a ply tire component, in addition to the final splice used to mount the ply on the tire manufacturing drum.

One disadvantage to the prior art process is that multiple splices are needed, which can contribute to tire nonuniformity, especially where the splices overlap cord, creating a very small increase in mass as well as more strength, less flexibility at a discrete location. Another disadvantage is that the exact spacing of the cord at the ends of the ply tire component can vary slightly, typically "bunching up" or increasing in epi resulting in more strength, less flexibility which could create an undulation in the tire sidewall. Further, the pic cord can also contribute to tire nonuniformity. A further disadvantage to the prior art process is that if the tire manufacturer needs to change the type or size of tire in production on a given drum, the spools of tire ply component will also need to be changed. Still further yet, there has been an increasing trend in high performance tires to use a tire ply component wherein the cords have a slight angle variation (generally ply runs radially from bead to bead at 90 degrees) to 88 degrees or some other desired angular variation. It is much more difficult to manufacture ply with an angular variation using the prior art processes.

Thus an improved method and apparatus of making a more uniform ply component for a tire having a uniform number of cords and uniform spacing of cords wherein there are no detectable splices. It is further desired to have a method and apparatus to manufacture ply wherein the gauge, width, cord angle and cord spacing may be easily changed without downtime of the machine. It is further desired to make the ply at the tire building drum, as there has been an increasing trend among tire manufacturers to be able to manufacture a variety of tires on a tire building machine without undue delay in switchovers.

DEFINITIONS

For ease of understanding this disclosure, the following terms are defined:

"Bead" means that part of the tire comprising an annular tensile member wrapped by ply cords and shaped, with or without other reinforcement elements such as flippers, chippers, apexes, toe guards, and chafers, to fit a design rim. The beads are associated with holding the tire to the wheel rim.

"Curing" means the process of heating or otherwise treating a rubber or plastic compound to convert it from a thermoplastic or fluid material into a solid, relatively heat-resistant state by causing cross-linking of the compound. When heating is employed, the process is called vulcanization.

"Elastomer" means a resilient material capable of recovering size and shape after deformation.

"Elastomeric article" is an article that is at least partially made from an elastomer.

"Innerliner" means the layer or layers of elastomer or other material that form the inside surface of a tubeless tire and that contain the inflating fluid within the tire.

"Pneumatic tire" means a laminated mechanical device of generally toroidal shape, usually an open torus, having beads and a tread and made of rubber, chemicals, fabric and steel or other materials. When mounted on the wheel of a motor vehicle, the tire, through its tread, provides traction and contains the fluid that sustains the vehicle load.

"Radial" and "radially" are used to mean directions toward or away from the axis of rotation of the tire.

DETAILED DESCRIPTION OF THE FIGURES

DETAILED DESCRIPTION OF THE INVENTION

FIGS. 1-6 illustrate a first embodiment of an apparatus 10 of the present invention for making a reinforced elastomer fabric such as ply 1. The invention allows for making an elastomeric reinforced fabric (hereinafter fabric) wherein the cord spacing, the cord angle, gauge and width may all be varied instantaneously without requiring any equipment shutdown. The apparatus 10 includes a creel 12 having a plurality of reels 14 for storing reinforcement filaments or cords (hereinafter "cords"), which may be made of any reinforcement filament, such as but not limited to, natural or synthetic materials such as rayon, polyester, nylon, cotton or steel wire. The cords may have been coated with a coating to increase the tack such as RFL (resorcinol formaldehyde latex) adhesive or any known adhesive coating compound used to increase the adhesion between the cord and elastomer.

Figure 9A:
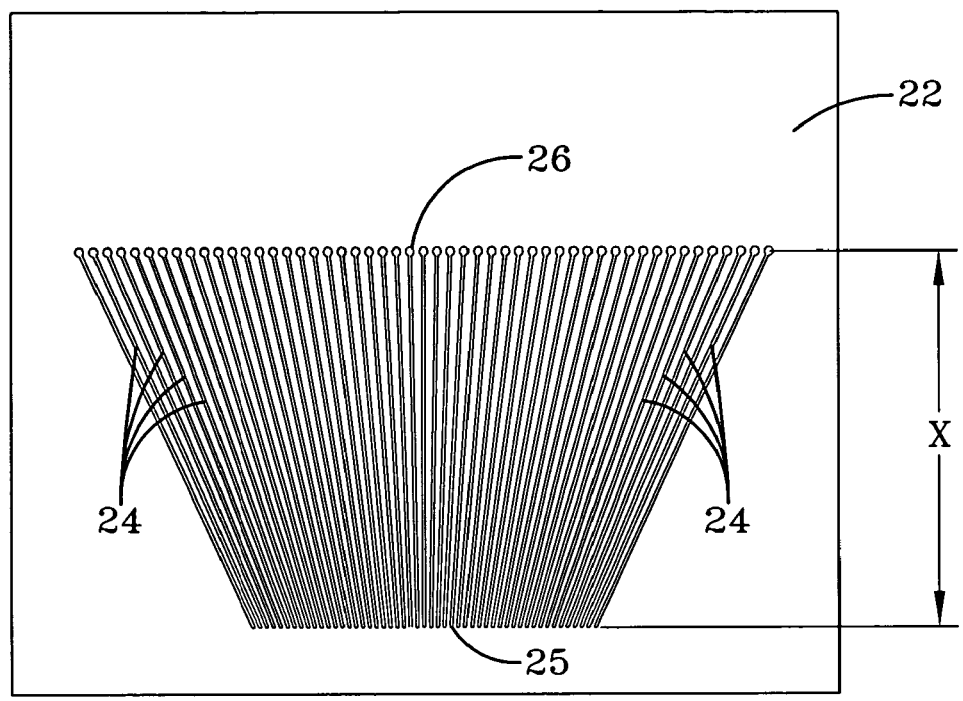
FIG. 9 is a front view of an adjustable epi die.
Figure 9B:
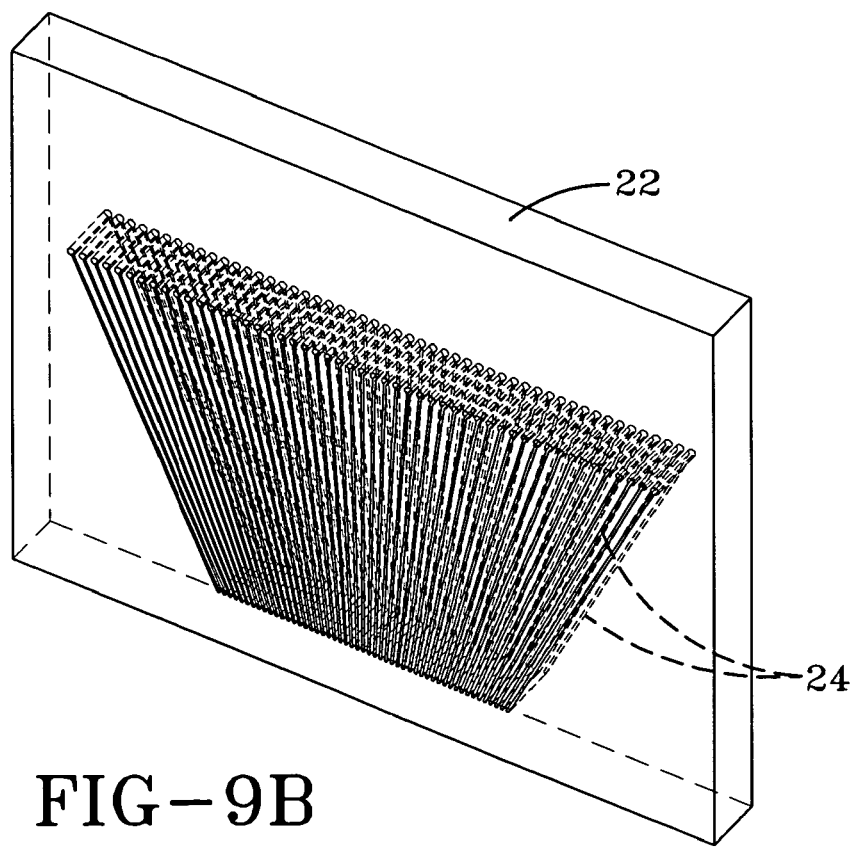
Figure 11:
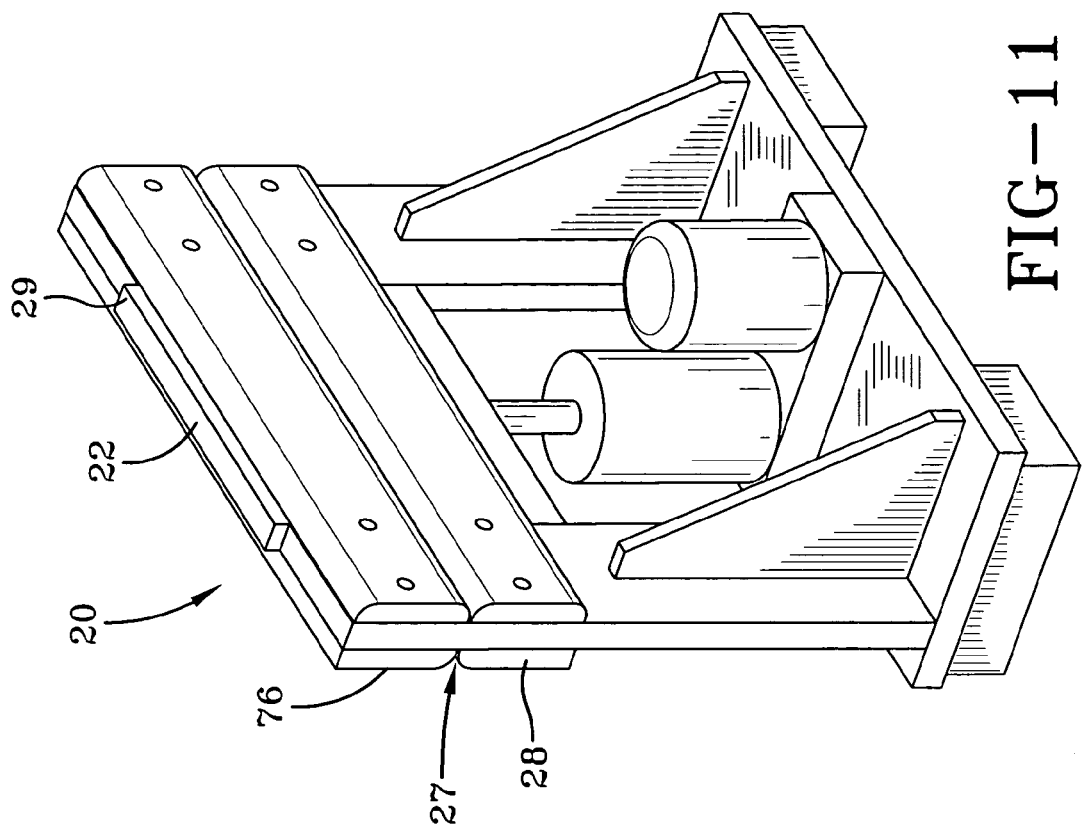
FIGS. 10 and 11 are front and perspective side views of a housing for the adjustable epi die of FIG. 9.
Figure 10:
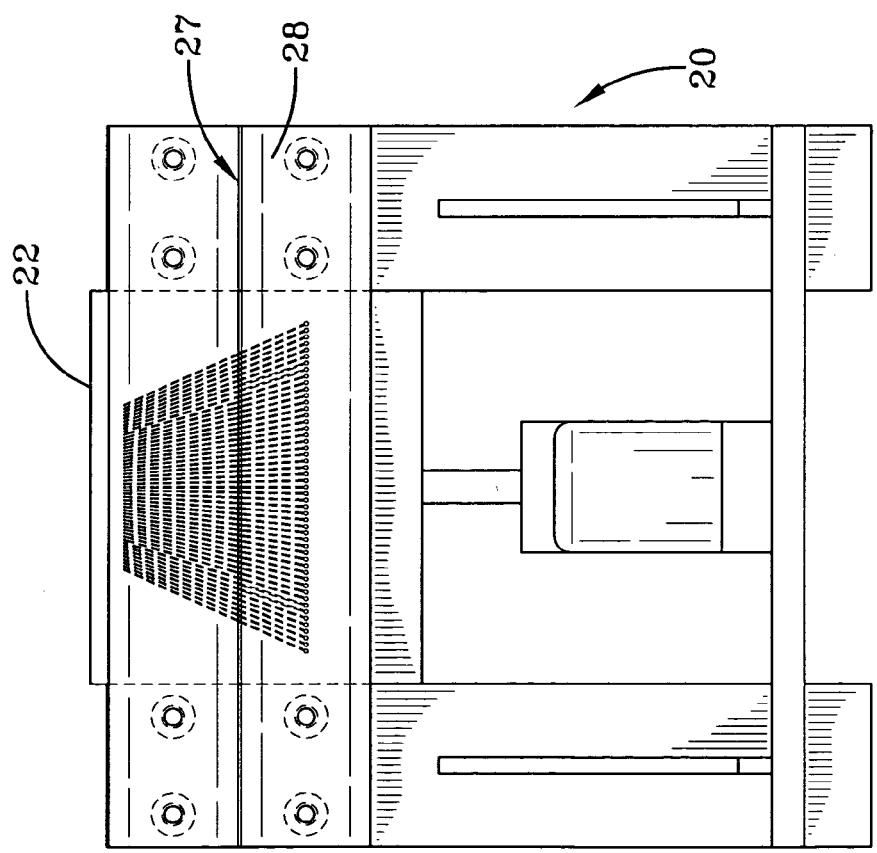

Each of the cords from the reels is individually threaded through holes of an optional guide plate (not shown). The cords are then threaded through an adjustable epi die 20,30 as shown in FIGS. 7-14, which is located adjacent a calender system. One example of an adjustable epi die 20 is shown in FIGS. 9-11, and includes a first plate 22 having a plurality of slots 24, wherein a single cord is received in a slot. A plurality of the slots is oriented at different angles, in the range of about 0 to about 30 degrees. The outer slots are oriented at a steeper angle than the interior slots. The slots are oriented closest together at the lower end 25 of the plate 22, giving the cords the highest epi. The upper end 26 of the plate has the slots oriented farthest apart, given the cords the lowest epi when in the upper position. The die is mounted within a housing 28 having an interior hole 29 for receiving the die plate 22 therein. The front section of the housing has a guide slot 27 for receiving the cord therethrough. The lower edge of the guide slot is preferably rounded. The die plate 22 is movably mounted with respect to the guide slot 27, and can be secured in a desired orientation with respect to the slots in the die. The orientation of the horizontal guide slot and the vertical location of the die within the housing, and thus the vertical location of the cord in the slot, dictates the cord spacing or epi. If a different EPI is needed, the die plate may be unsecured and moved upward for increasing epi or downward for decreasing epi. As the slots are linear, there is a linear relationship between the desired epi and the location of the cords within the slots. It is important to note that the epi can be adjusted without requiring the cord to be rethreaded on the die or other system components. Further, the vertical location of the plate within the housing may be servo-controlled by a system controller (not shown) for an automated system.

Figure 12A:
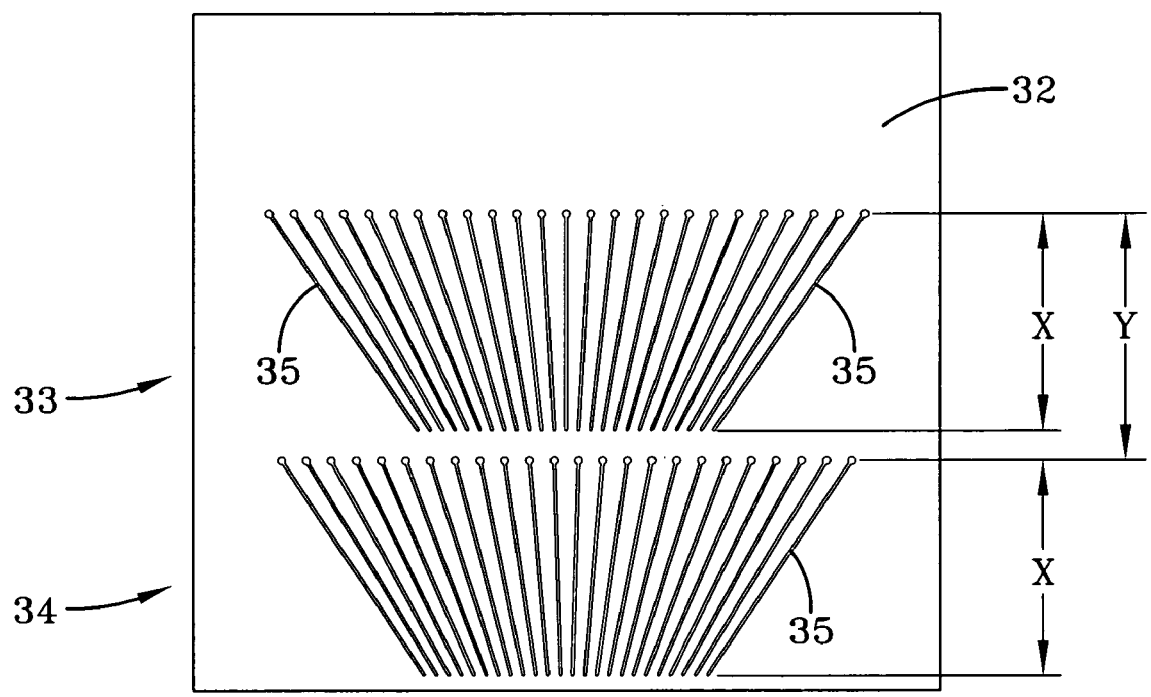
FIG. 12 is a second embodiment of an adjustable epi die.
Figure 12B:
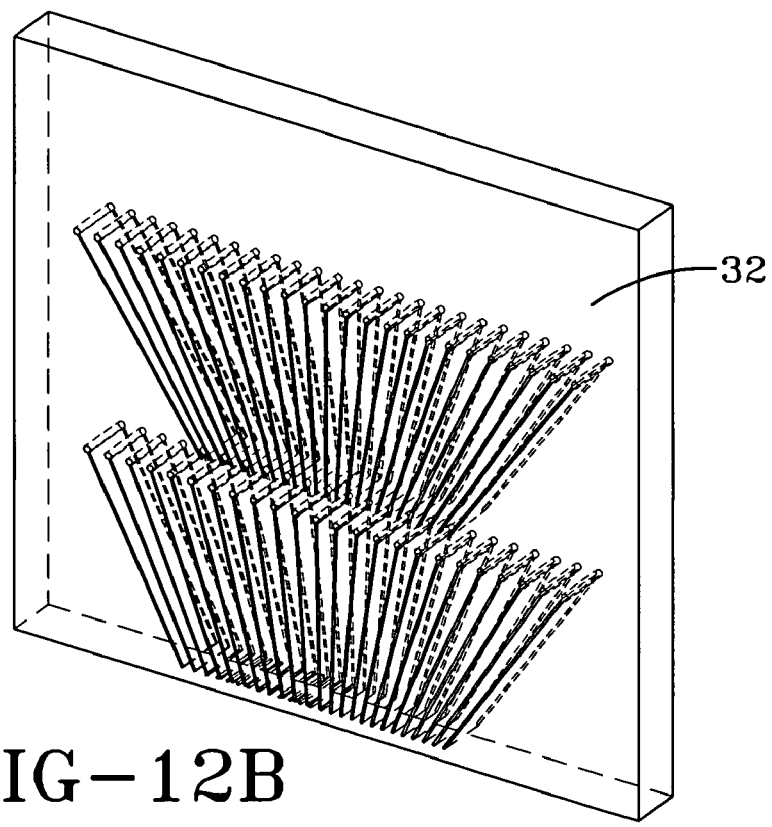
Figure 14:
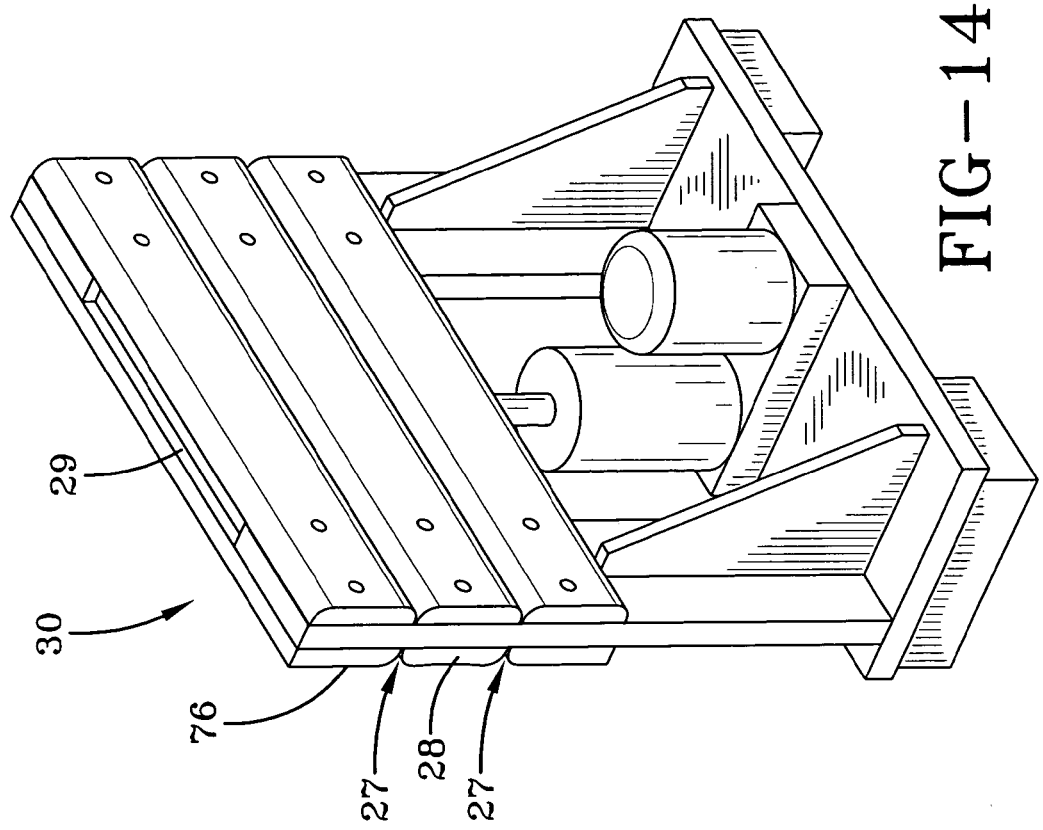
FIGS. 13 and 14 are front and perspective side views of a housing for the adjustable epi die of FIG. 12.
Figure 13:
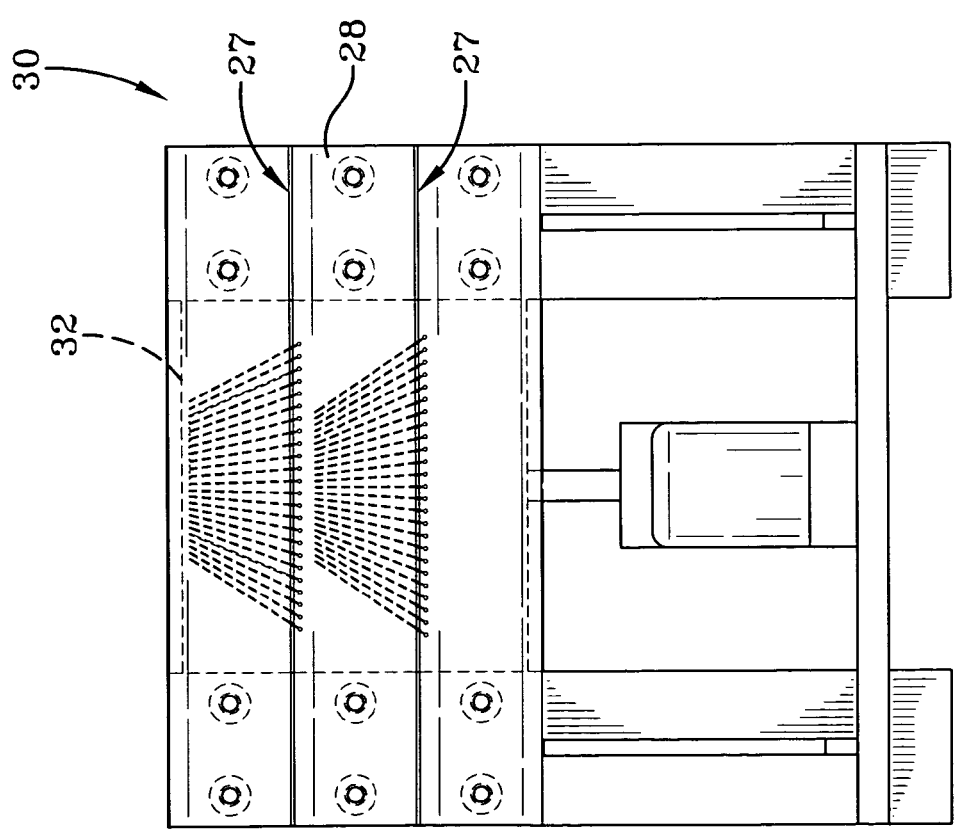

A second example of an adjustable epi die 30 is shown in FIGS. 12-14. As shown in FIG. 12, the die plate 32 has two rows 33,34 of fan shaped slots 35 which vary in angular inclination from about 0 degrees near the center of the plate to about 30 degrees near the outer ends of the plate. The die housing is the same as described above, except that there are two guide slots 27, one for each row 33,34 of fan shaped slots 35. The two rows of slots allow for an increase in epi spacing as compared to the die 22 of FIG. 9. Each row of cords 33,34 are located adjacent the calender and each row of cords are pressed into the calendered elastomer gum, resulting in the desired epi spacing.

Figure 15:
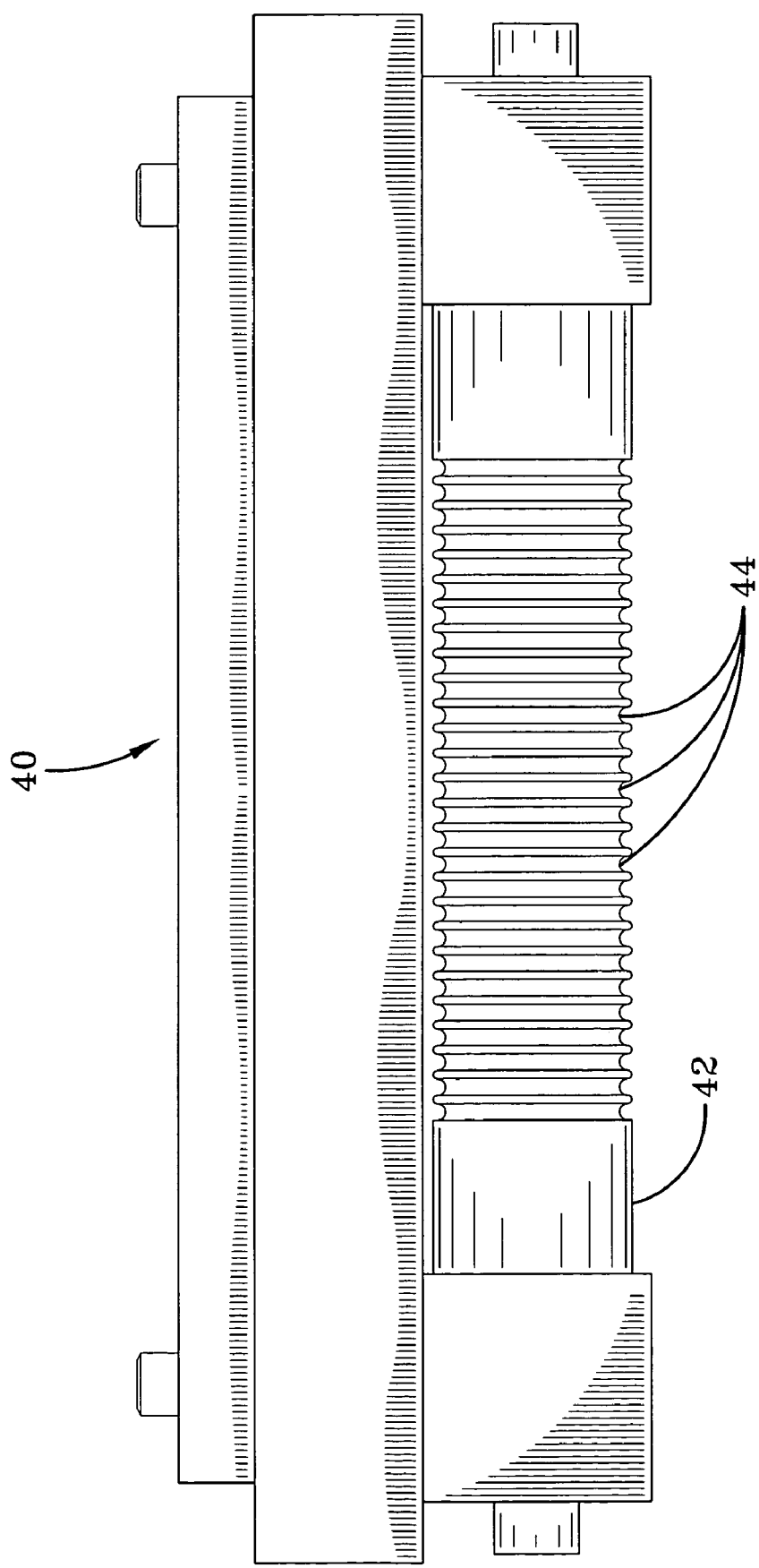
FIG. 15 is a third embodiment of an epi die.
Figure 16:
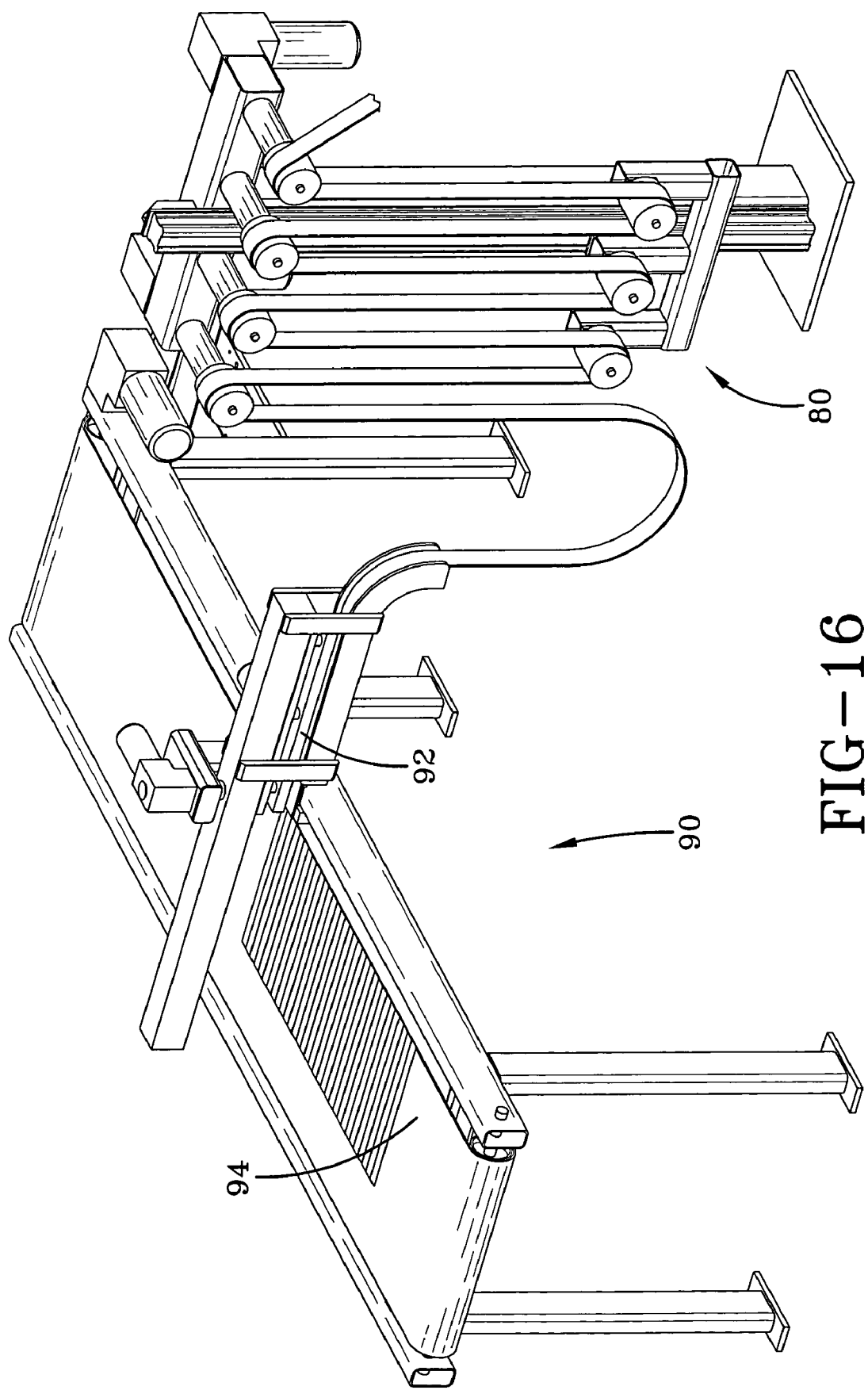
FIG. 16 is a front perspective view of a ply assembly machine.
Figure 17:
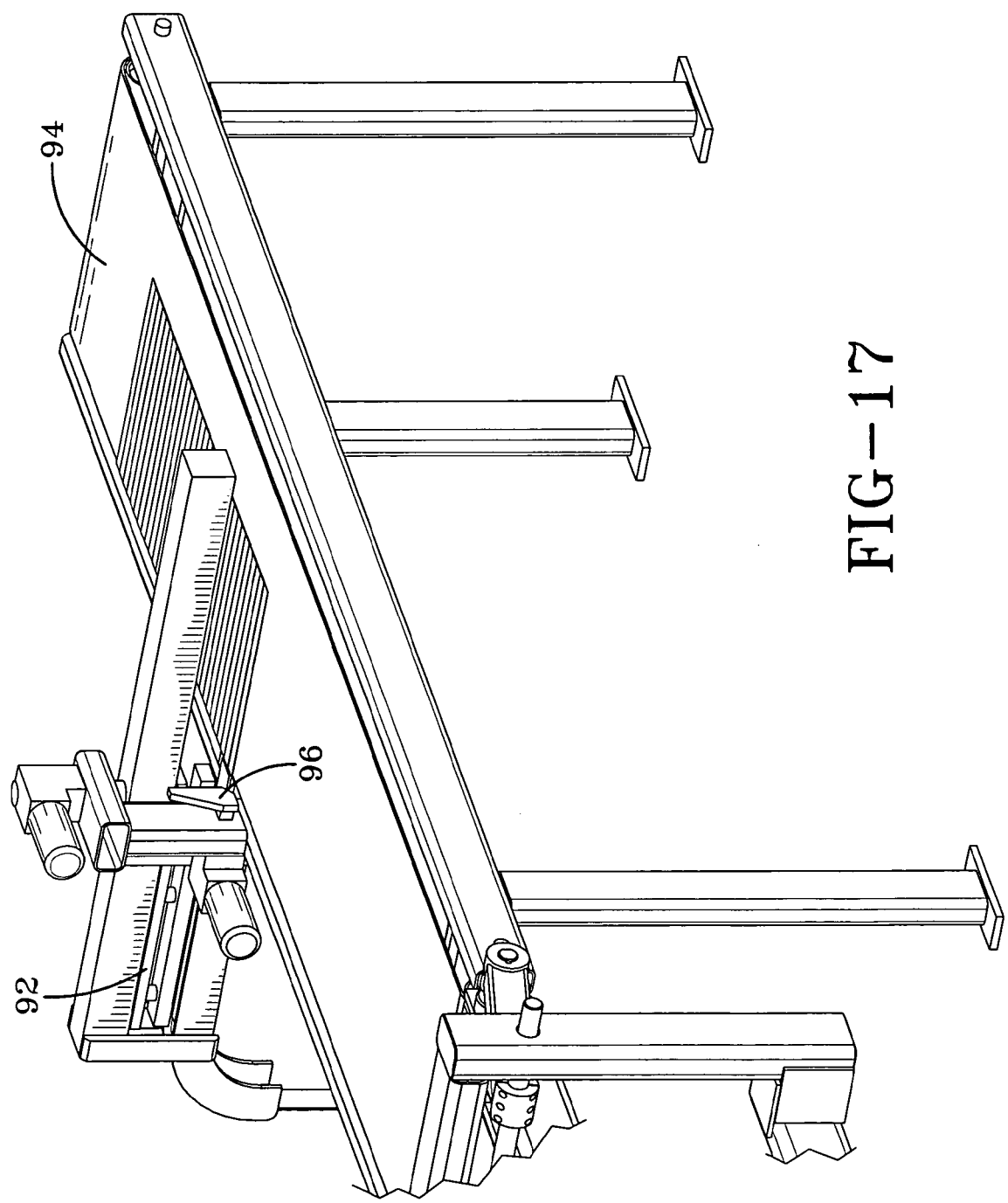
FIG. 17 is a rear perspective view of a ply assembly machine of FIG. 16.
Figure 18:
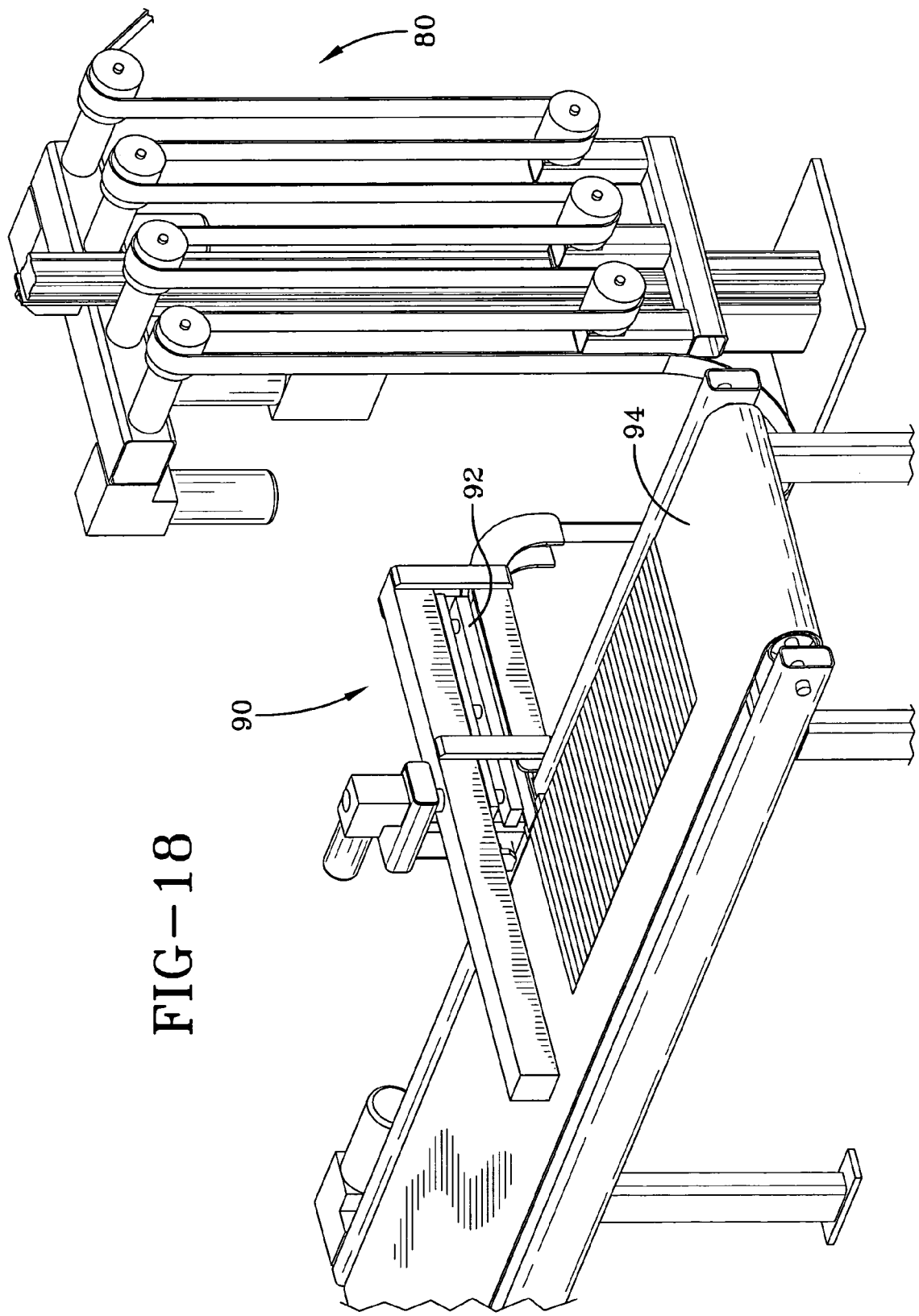
FIG. 18 is a side perspective view of a ply assembly machine of FIG. 16.

Alternatively, a fixed epi die 40 may be used, such as shown in FIG. 15. In one example, the fixed epi die may comprise a cylinder 42 having circular circumferential grooves 44, wherein a cord sits in a respective groove. The spacing between grooves dictate the epi.

Figure 1:
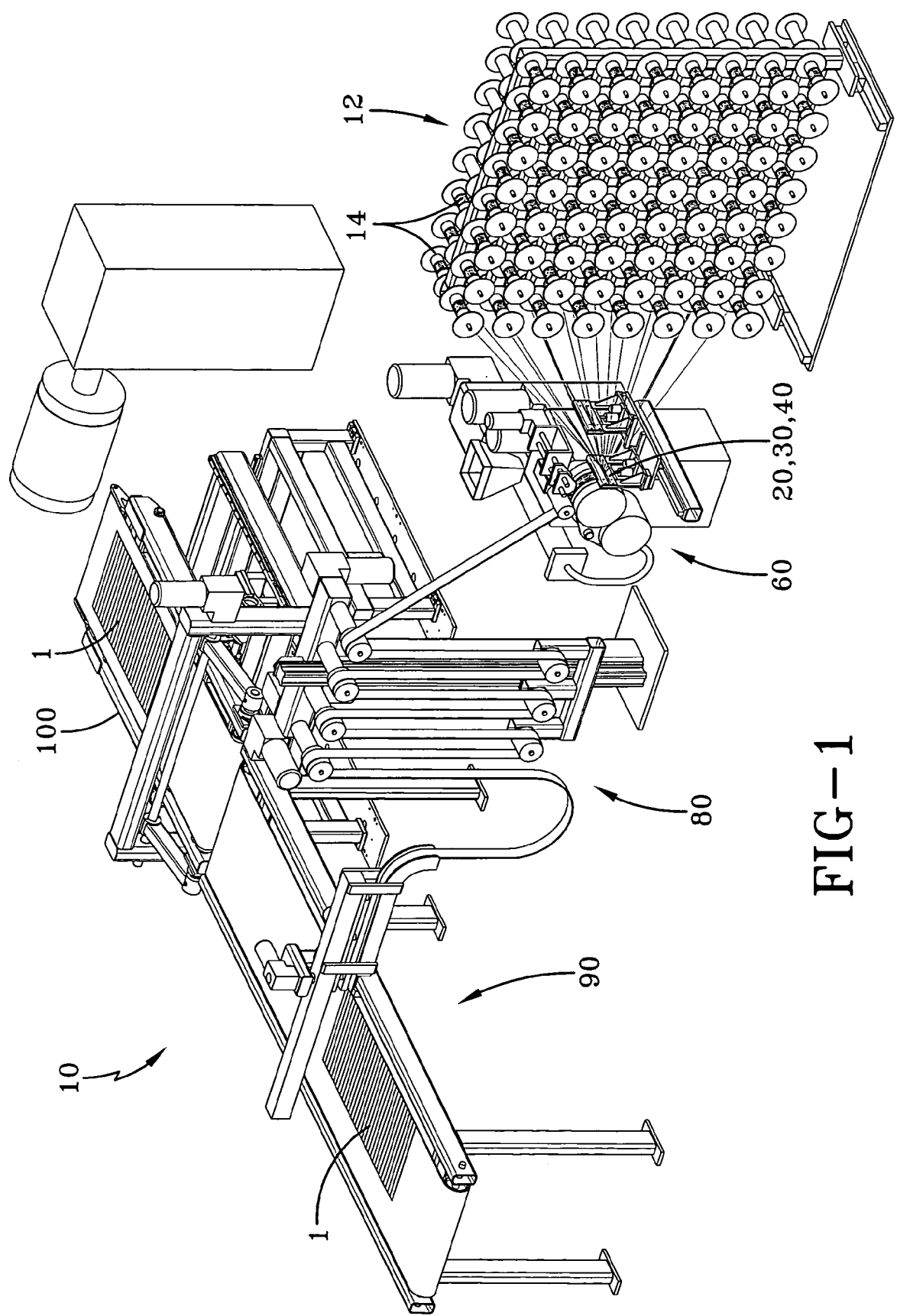
FIG. 1 is perspective view of the apparatus of the invention.
Figure 2:
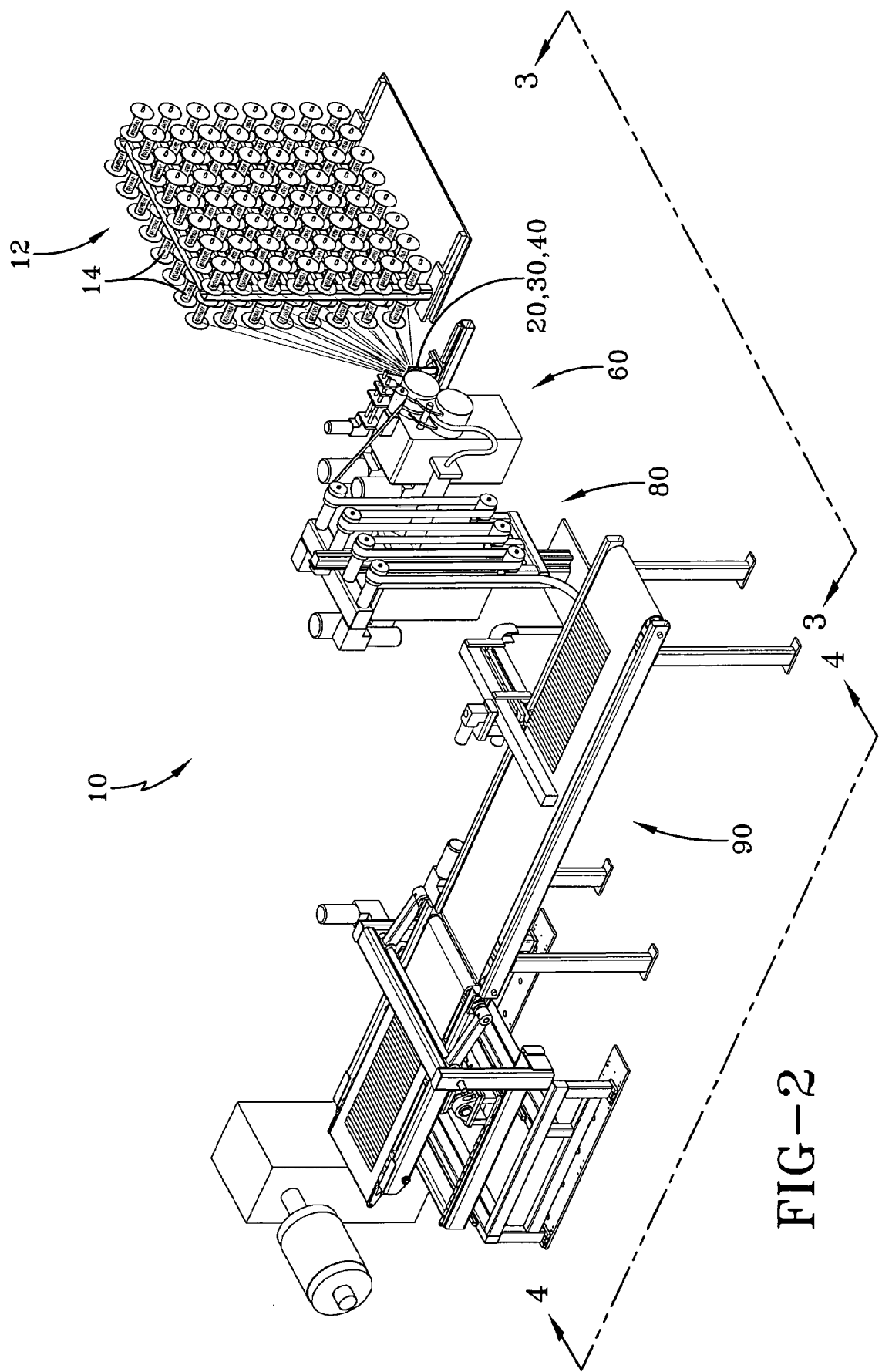
FIG. 2 is a perspective view of the other side of the apparatus shown in FIG. 1.
Figure 3:
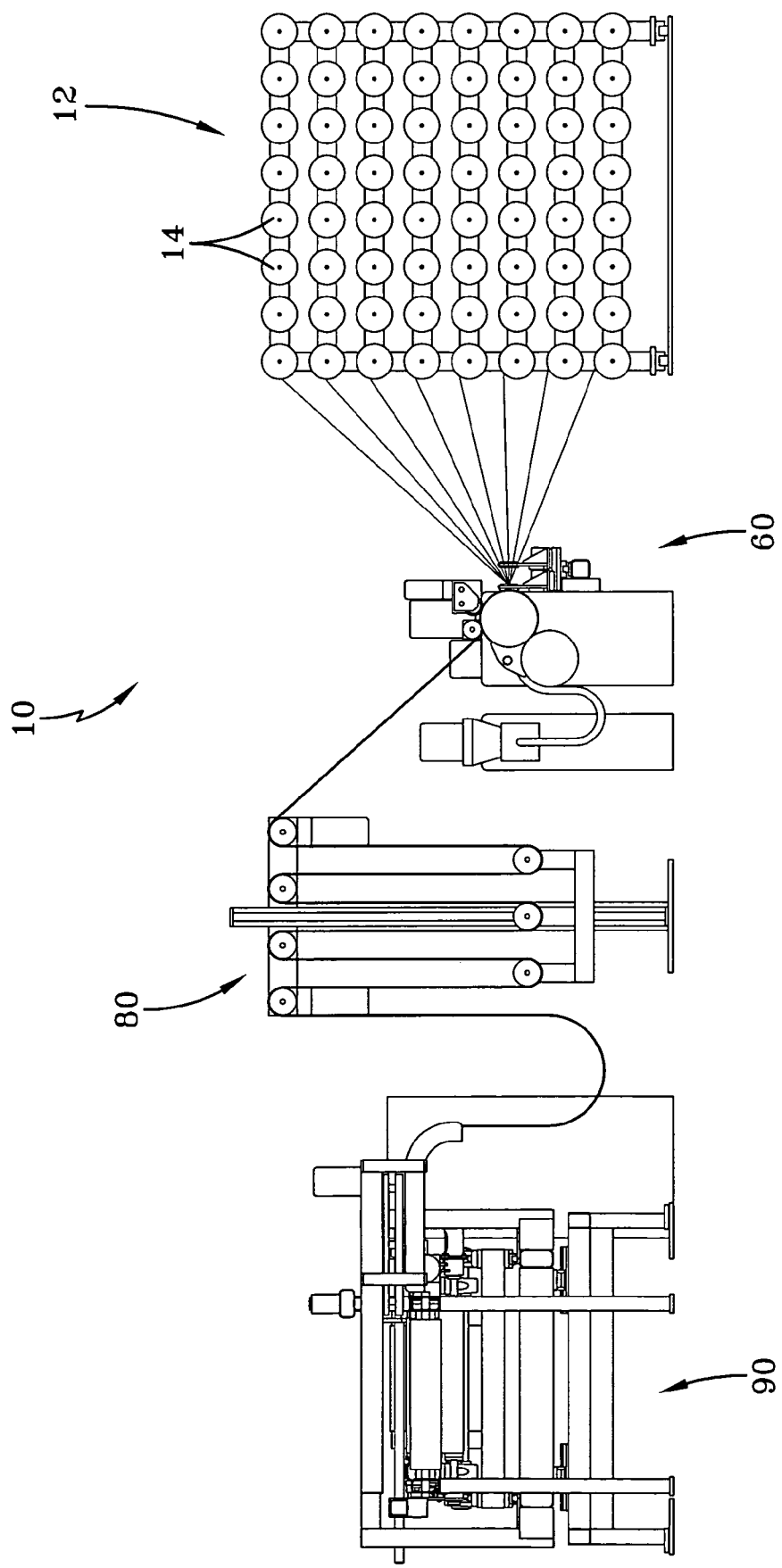
FIG. 3 is a side view in the direction 3-3 of FIG. 2.
Figure 4:
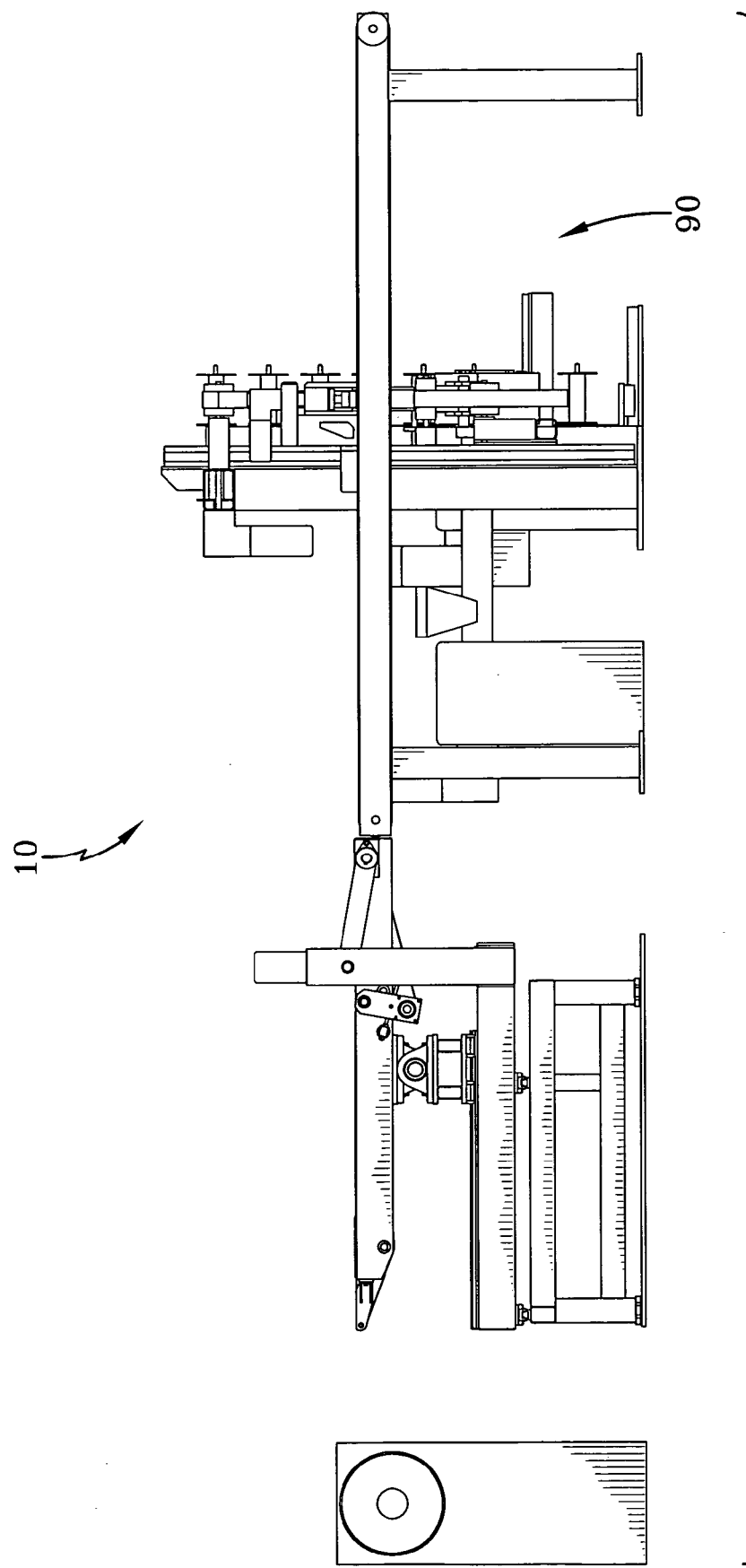
FIG. 4 is a side view in the direction 4-4 of FIG. 2.
Figure 5:
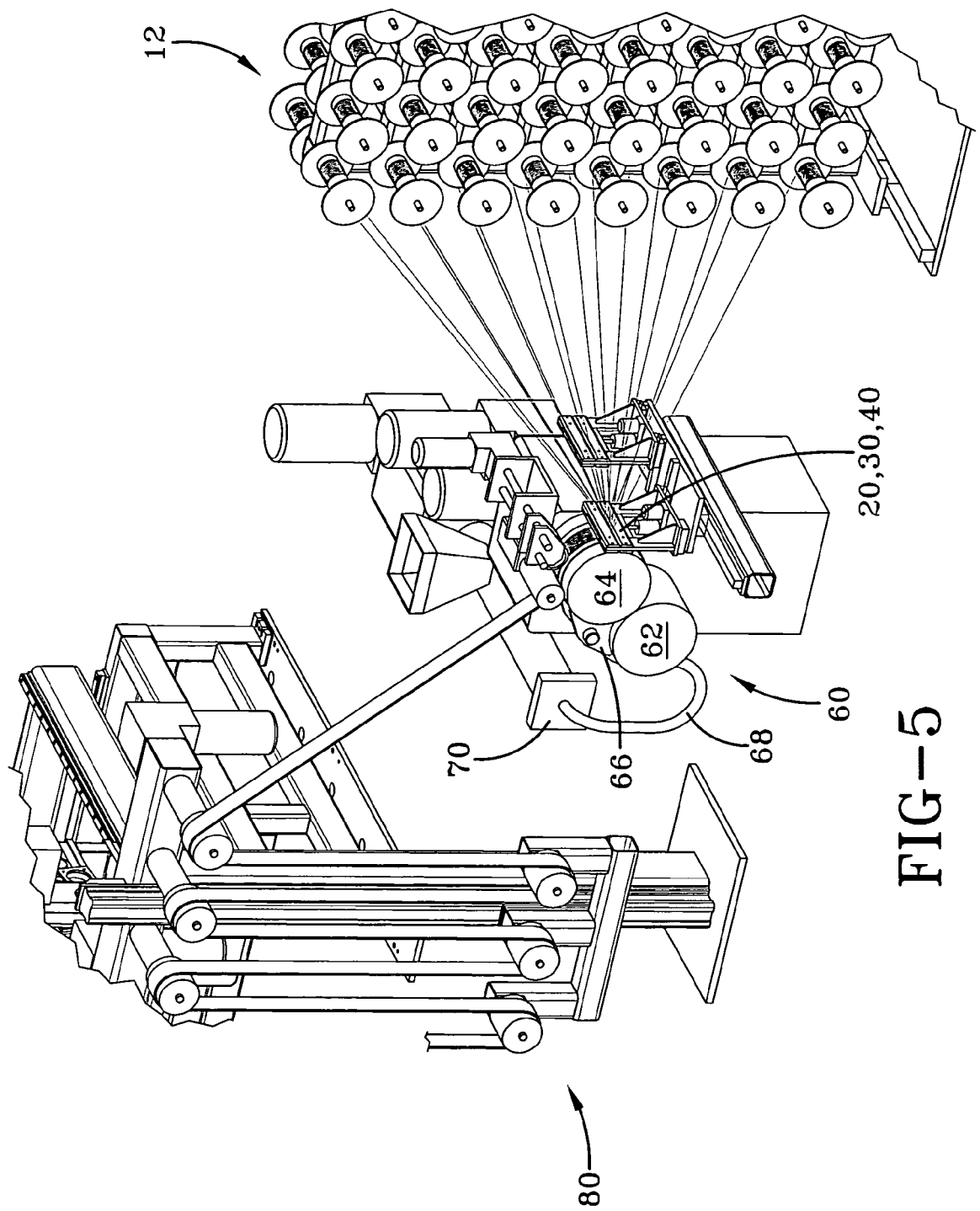
FIG. 5 is a perspective view of a calender and adjustable epi die.
Figure 6:
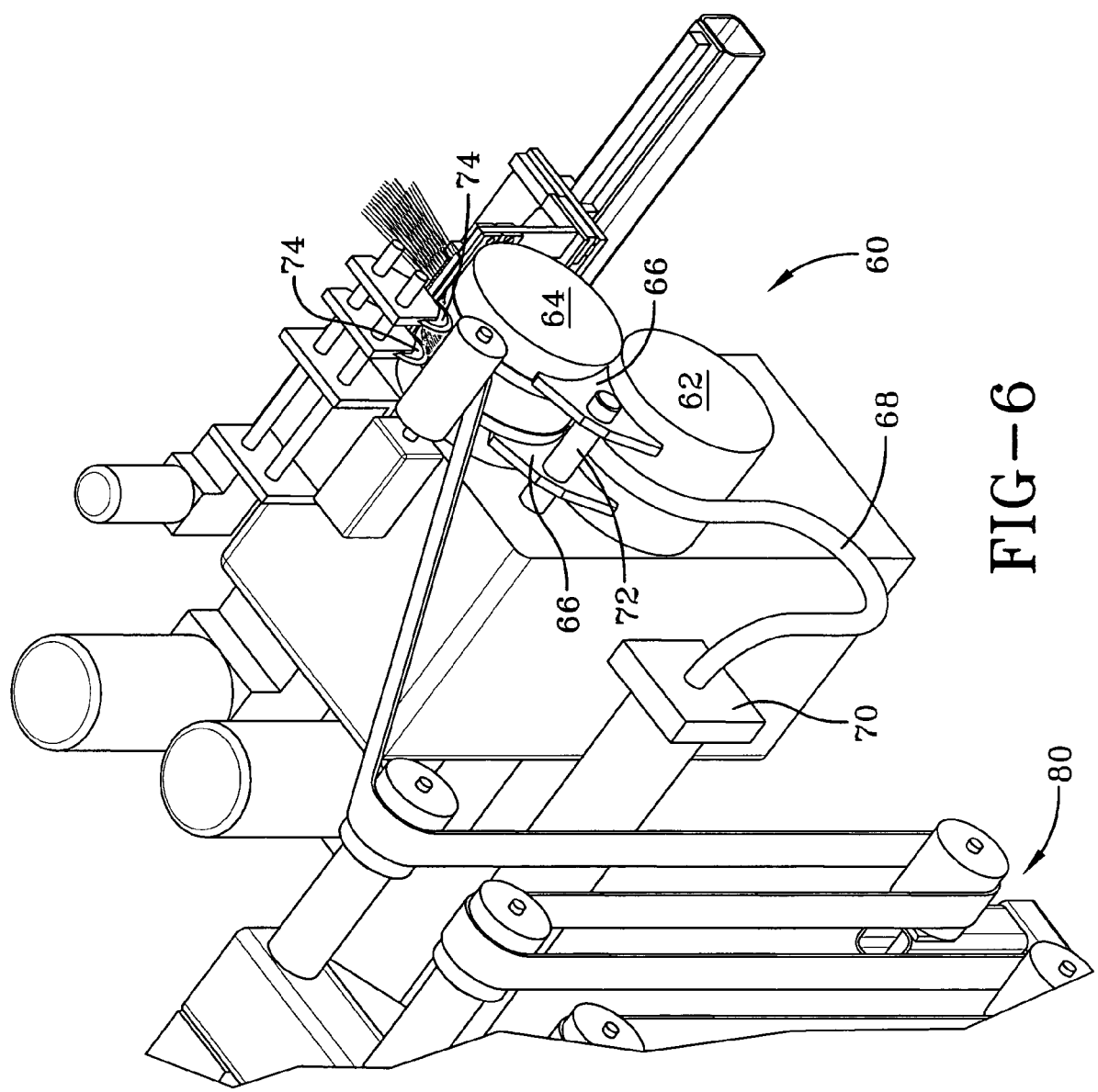
FIG. 6 is a top perspective view of the calender and adjustable epi die of FIG. 5.
Figure 7:
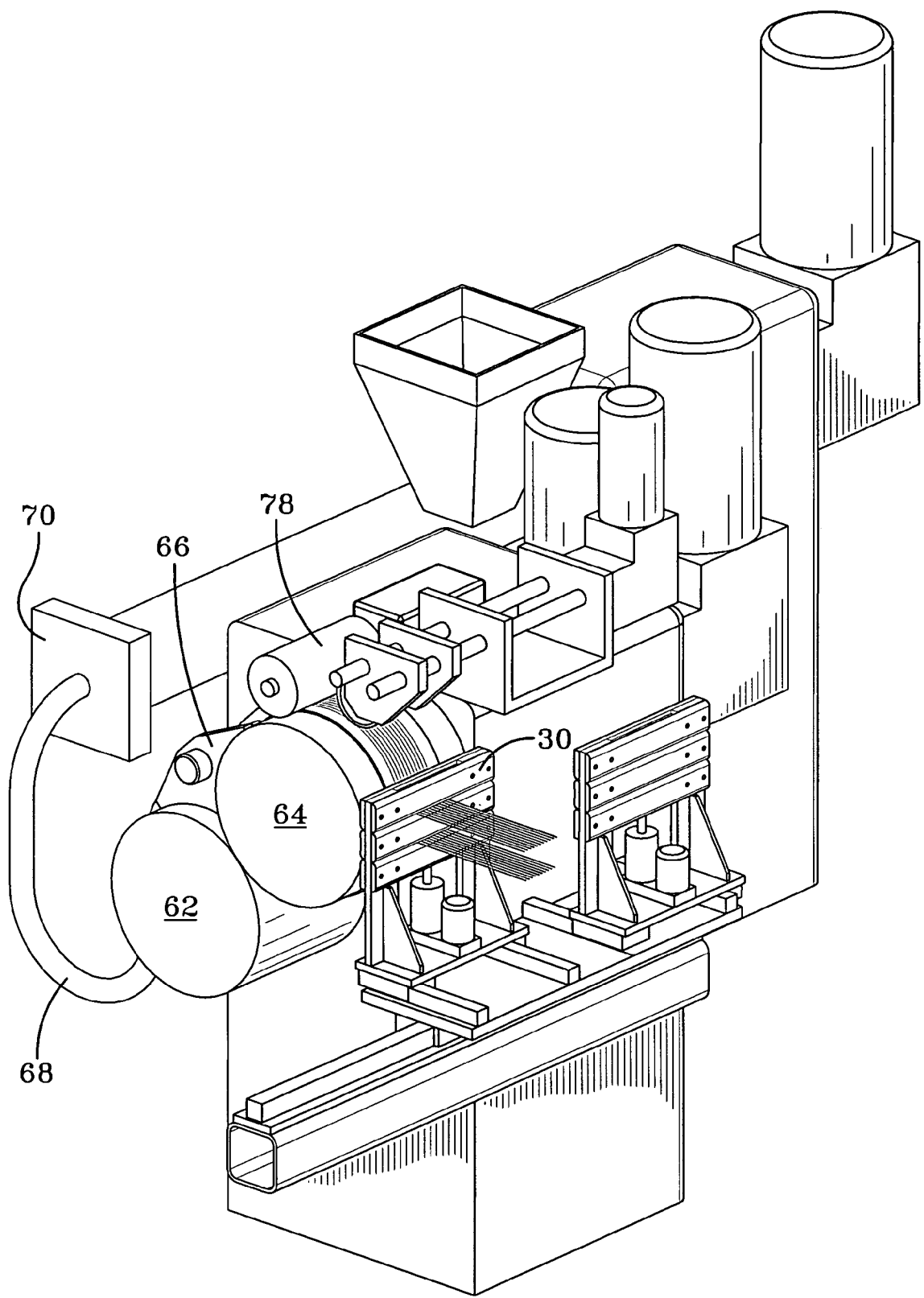
FIG. 7 is a perspective view of a second embodiment of a calender and adjustable epi die.
Figure 8:
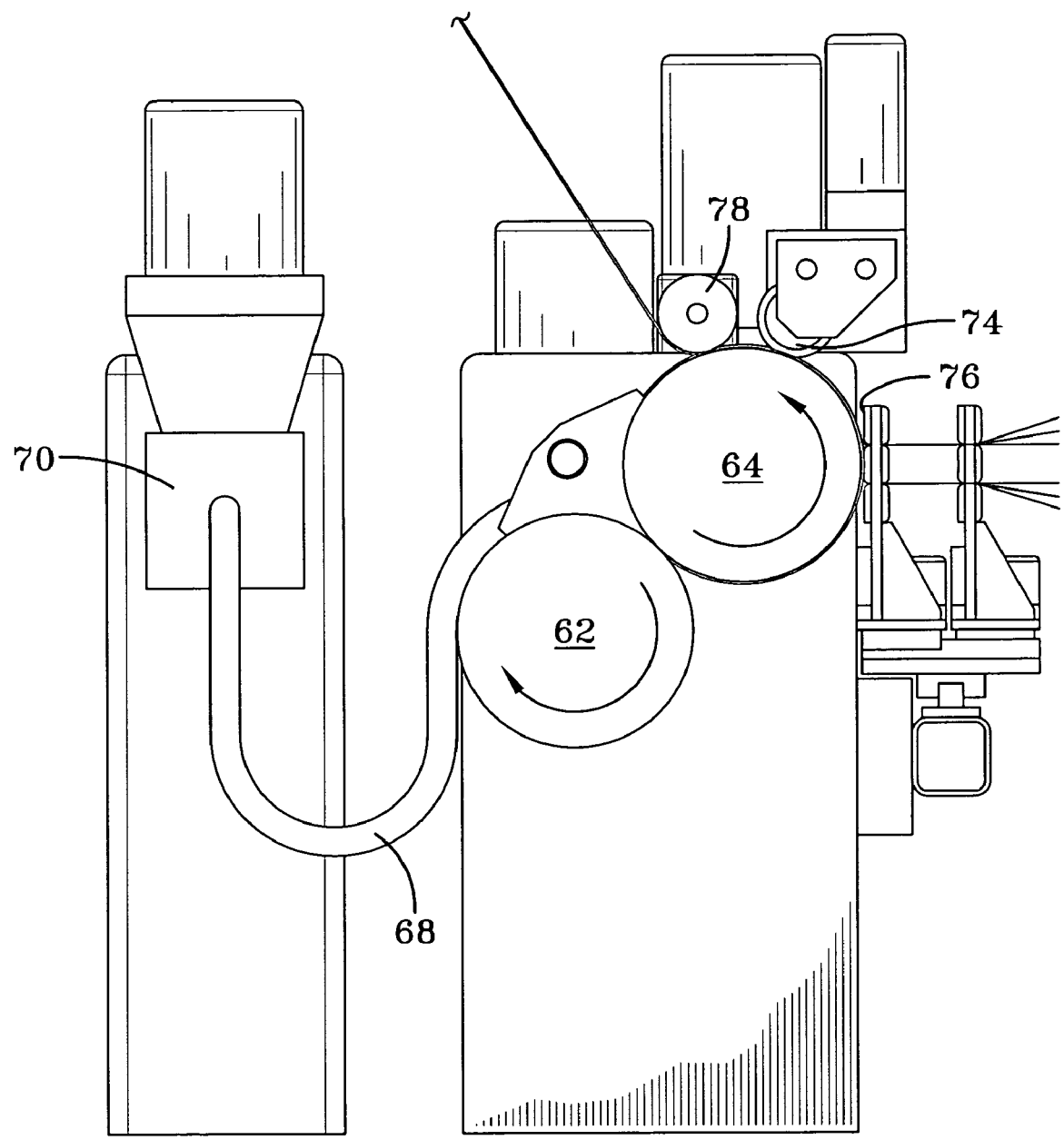
FIG. 8 is a side view of the calender and adjustable epi die of FIG. 7.

One of the above described dies are mounted closely adjacent a calender system 60, as shown in FIG. 5. The calender system includes a first and second calender roll 62,64 with a set of plows 66 mounted thereon. An extruded tube 68 of rubber or elastomer material exits an extruder 70 and is fed into the bite 72 of the calender rolls 62,64. A set of trim knives 74 trims the continuous strip to the desired width, which is adjustable. The thickness of the strip is dictated by the gap or spacing between the calender rolls, and is also adjustable. The back surface 76 of the die housing abuts a calender roll 64 of the calender system 60. The cords are pressed up against the calender roll in contact with a strip of rubber. The cords may be further pressed into the strip by an optional stitcher roll 78. The cords run longitudinally, i.e., along the length of the continuous strip.

Figure 20:
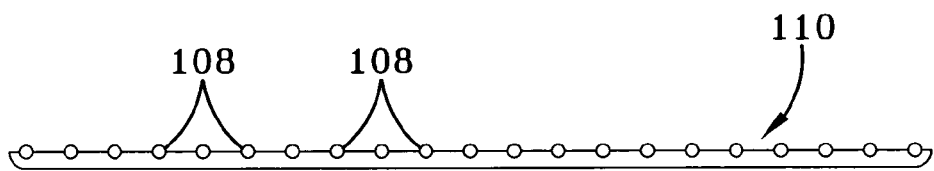
FIG. 20 is a side view of a second embodiment of a segment.

In one example, the cords 108 are pressed into the strips 110 so that they are flush with the material outer surface as shown in FIG. 20. Thus all of the elastomeric material is on one side of the cords.

Figure 19:
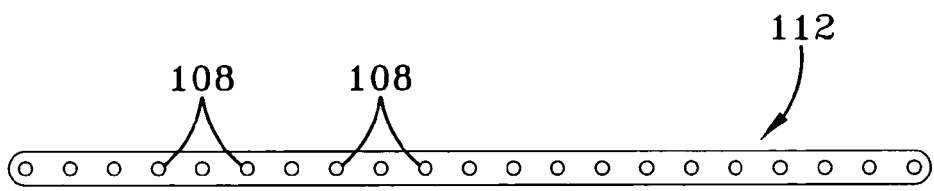
FIG. 19 is a side view of a first embodiment of a segment.

In a second example, the cords 108 are located in the middle of the strip 112 as shown in FIG. 19. In order to accomplish this result, a first and second calender system 60 is used to deposit material on both sides of the cords. Alternatively, a crosshead extruder as described in more detail below, may be used to form the strip.

After the continuous reinforced strip exits the calender, it is fed to a festoon 80, which can take up the slack and store the continuous strip temporarily. From the festoon, the strip is fed into an assembler machine 90, which cuts the strips into segments of a specific length. The machine using a pick up arm 92 picks up a segment and places it onto an assembly conveyor belt 94. The assembly conveyor is then indexed forward, a new segment is cut by cutter blade 96 and then placed on the conveyor belt so that the second segment is placed partially over the first segment and the conveyor. The process repeats until the desired number of strips has been assembled.

One example of an assembler machine which may be utilized is manufactured by Steelastic LLC of Akron, Ohio. A second example of a pick and place machine which would work with the invention is shown in U.S. Pat. No. 4,087,308, which is incorporated by reference in its entirety.

A controller either on the machine or in communication with the machine (not shown) senses the length of the strip being fed into the machine, communicates to a cutter to cut the strips into segments of the desired length. The cutter blade 96 cuts the strip transversely across the cords into segments.

The assembler machine 90 may also be utilized to make ply having the cords oriented at angle ranging from about 85 to about 90 degrees. In order to accomplish this, the assembler arm is rotated, and the continuous strips are cut at an angle to form the segments. The segments are oriented on the applier conveyor belt at the desired angle and lapped together as described above.

The widths of the segments are adjustable, and may have, in one example, a width of pi (3.14) or some multiple on the number pi. For example, strips can have a pi, 2*pi, pi/2, pi/3 width, etc. The segments have a length which is the same as the desired tire component ply width. The gauge thickness of the strips is half the thickness of the desired tire component. The epi of the cords within the strip are half the desired gauge in the tire.

Figure 21:
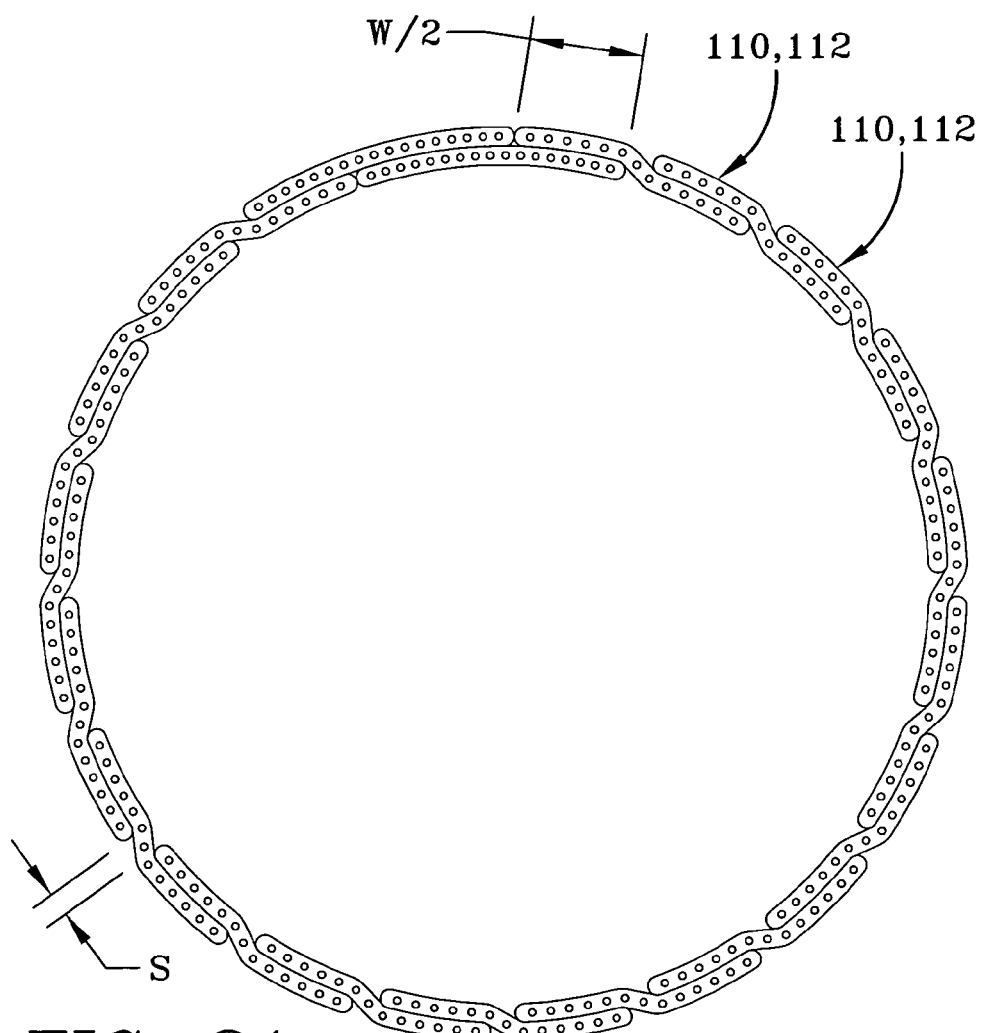
FIG. 21 is a cross sectional view of ply spliced together about a drum.

A first example of a segment configuration 110 for a tire ply has cords flush with the surface of the elastomeric segment as shown in FIG. 20. Each segment has a pi width, a length L and a thickness one half of the gauge of the final end product tire ply. The cords 108 run parallel with the length and have half the desired epi of the final tire ply. The edges of the segment are joined together in a Z configuration as shown in FIG. 21. For the Z configuration, the first segment is laid flat on conveyor. A second segment is laid over the first segment, wherein ½ of second segment width is overlaid the first segment in a lap splice, while the other ½ of the segment is laid flat on conveyor, forming a z shape when viewed from the side. The overlapped sections have a pi/2 circumferential width (½ the segment width). The z configuration allows for a small spacing adjustment s. This configuration also allows an even or odd number of segments. As shown in FIG. 21, the resulting tire ply has at any given radial location, two effective segments layers, so that the effective epi and gauge thickness of the final tire ply has double the segment epi and gauge, respectively. Further, since each segments are lap sliced together wherein each splice has a width of half of the segment width, the splices are very strong. However since there are no extra cords at the location of the splice, i.e., cord spacing and count is maintained, the splices do not contribute to nonuniformity of the tire. After the segments have been stitched together, a ply fabric is formed which has the desired gauge thickness, epi spacing, width and very strong undetectable splices (no cord overlapping).

Figure 22A:
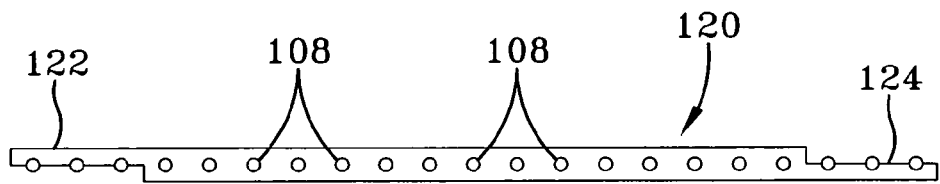
FIG. 22a is a side view of a third embodiment of a segment.
Figure 22B:
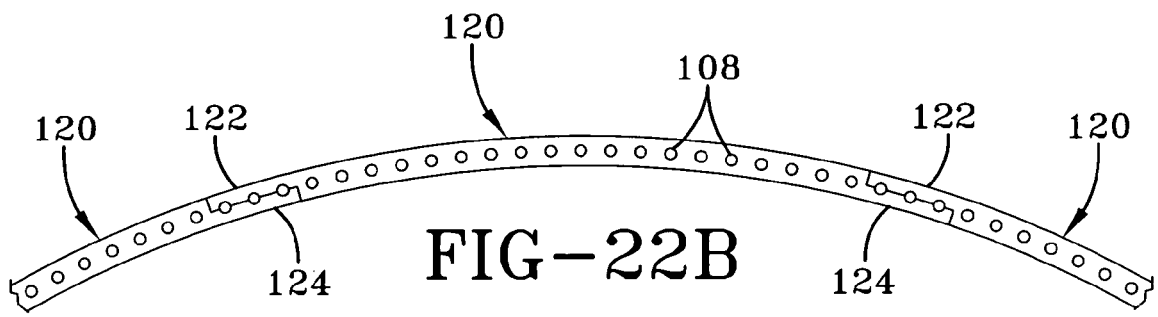
FIG. 22b is a side view showing segments spliced together.

A second example of a segment configuration is shown in FIGS. 22*a* and 22*b*. Each segment 120 has a plurality of cords 108, which have the same epi as the desired epi of the final ply product. The cords are located in the middle of the ply. The gauge thickness of each segment is the desired gauge of the final ply product. Each segment has a pi width, and a length L. Extending from each segment end is a flap 122, 124 having about half the gauge thickness of the middle of the segment. Each flap has cords having half the desired epi. The segments can be made on a mini calender apparatus. As shown in FIG. 22*b*, a flap 122 of a segment end is joined with a flap 124 of an adjacent segment. When all the segments are joined together, at any given location the final ply product has the same uniform thickness, epi and number of cords.

Figure 23A:
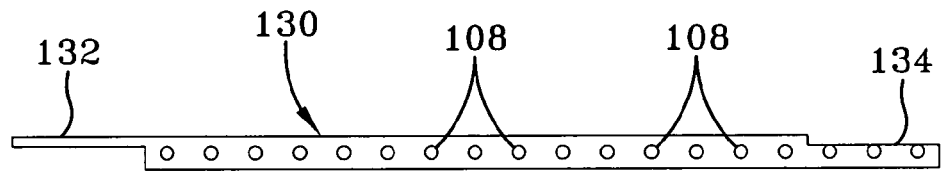
FIG. 23a is a side view of a fourth embodiment of a segment.
Figure 23B:
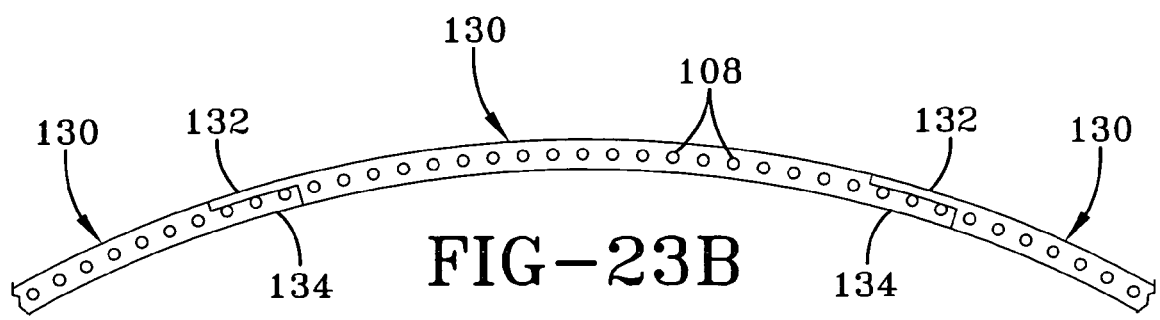
FIG. 23b is a side view showing segments spliced together.

A third example of a segment configuration 130 is shown in FIGS. 23*a* and 23*b*. The segment configuration is the same as the second example described above, except for the following. A flap 132 on a first end of the segment has half the gauge thickness with no cords. A flap 134 on a second end of the segment has half the gauge thickness and the desired epi and cord count as the final ply product. When the segments are spliced together end to end, the result is a final ply product having uniform thickness, epi and number of cords.

Figure 24A:
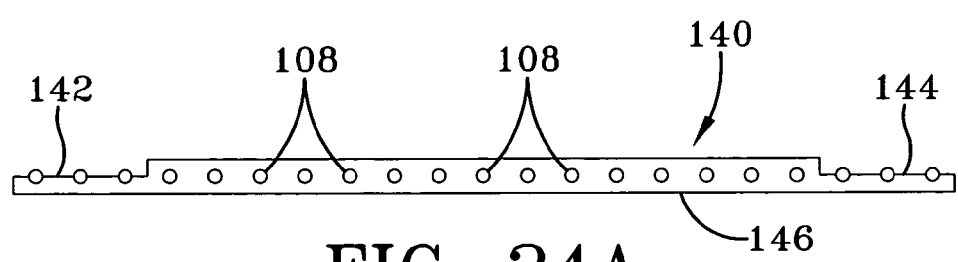
FIG. 24a is a side view of a fifth embodiment of a segment.
Figure 24B:
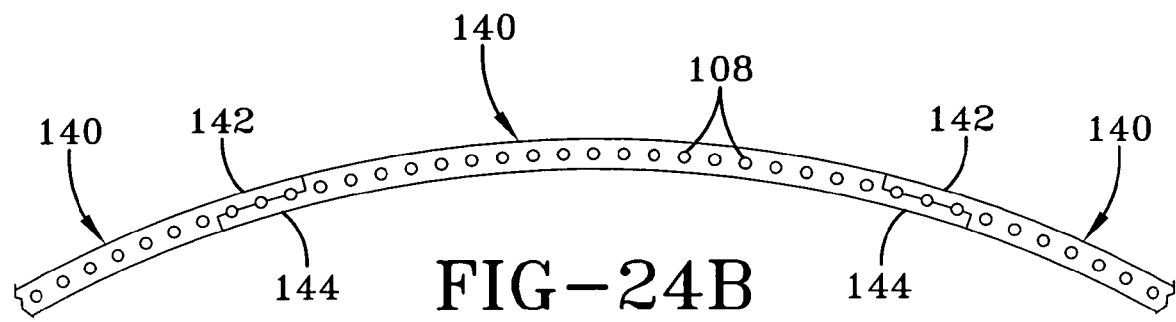
FIG. 24b is a side view showing segments spliced together.
Figure 25:
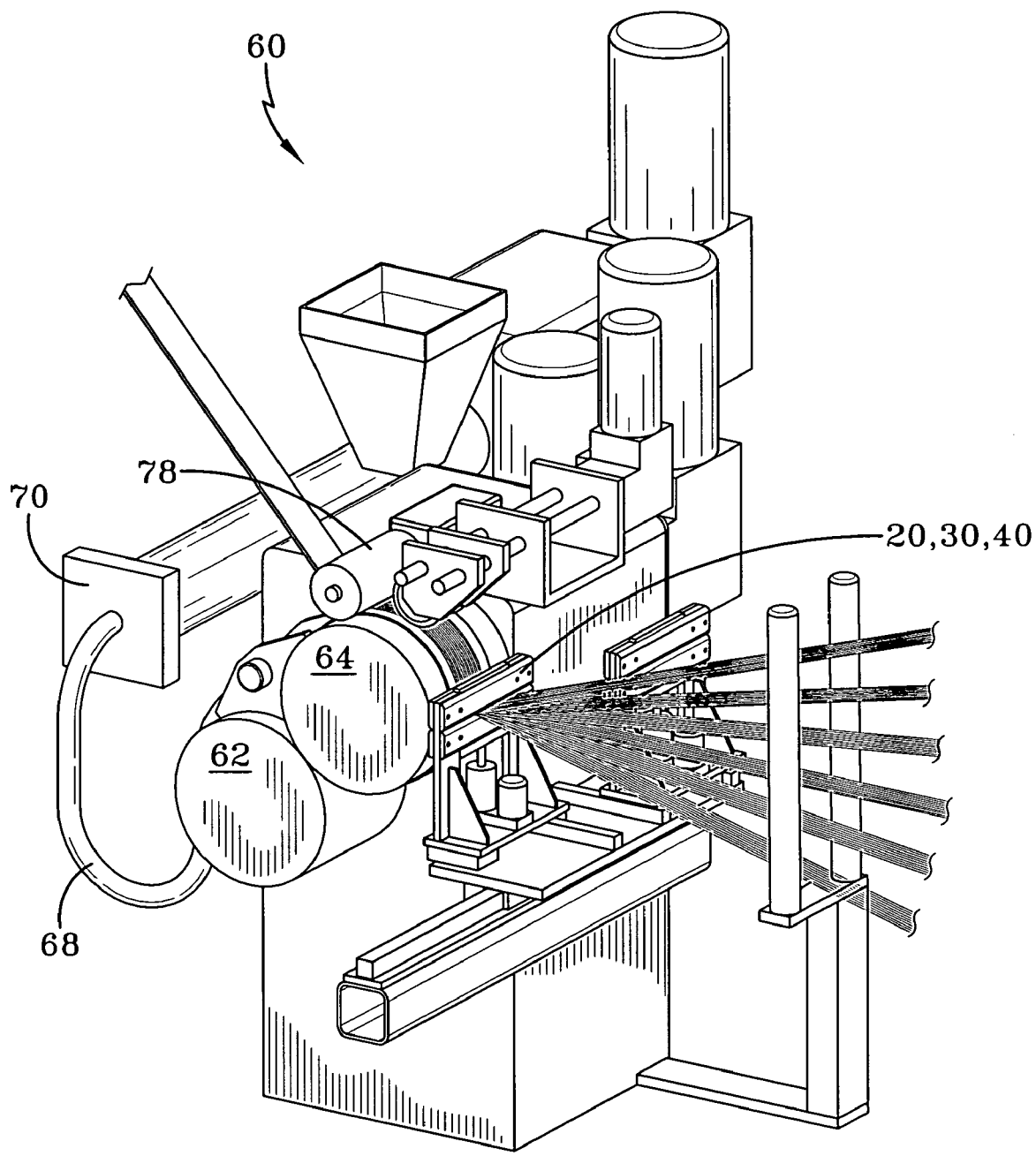
FIG. 25 is a perspective view of a crosshead extruder.

A fourth example of a segment configuration 140 is shown in FIGS. 24*a* and 24*b*. The segment configuration is the same as the second example described above, except for the following. Both the flaps ends 142, 144 extend from the same edge 146 of the segment.

Figure 26A:
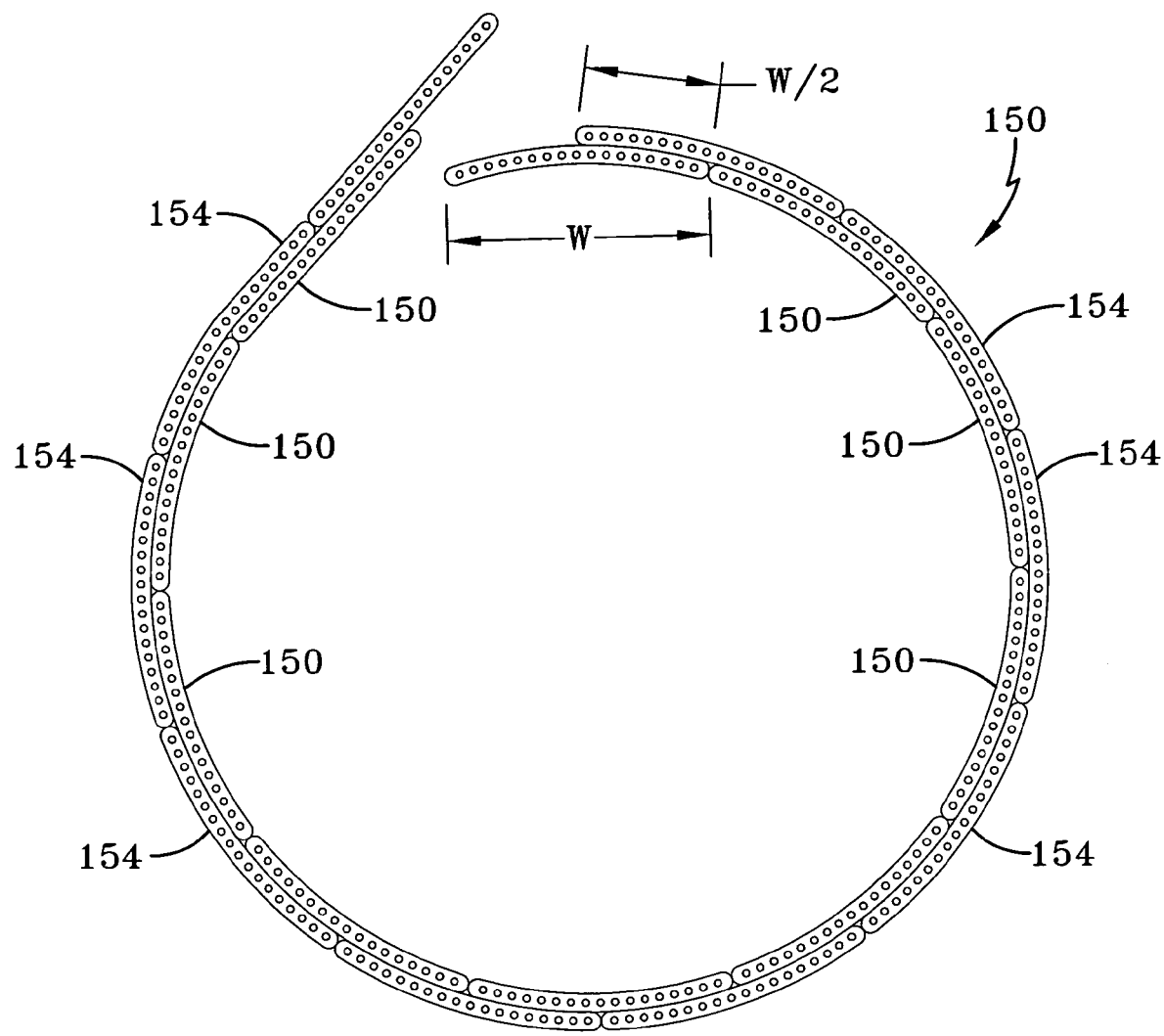
FIGS. 26a and 26b and 27 are cross-sectional views of a second embodiment of a segment configuration.
Figure 26B:
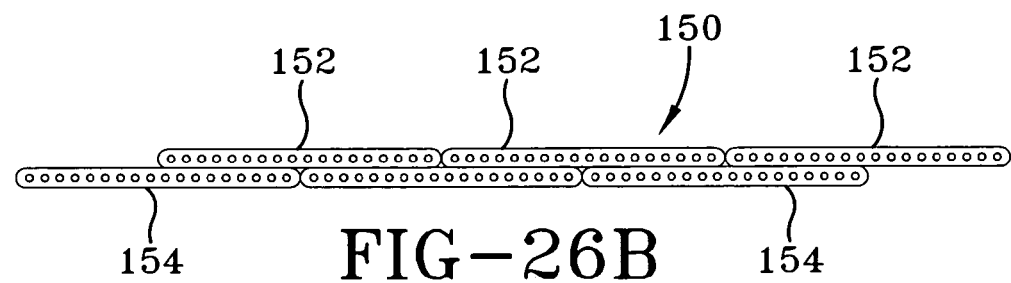
Figure 27:
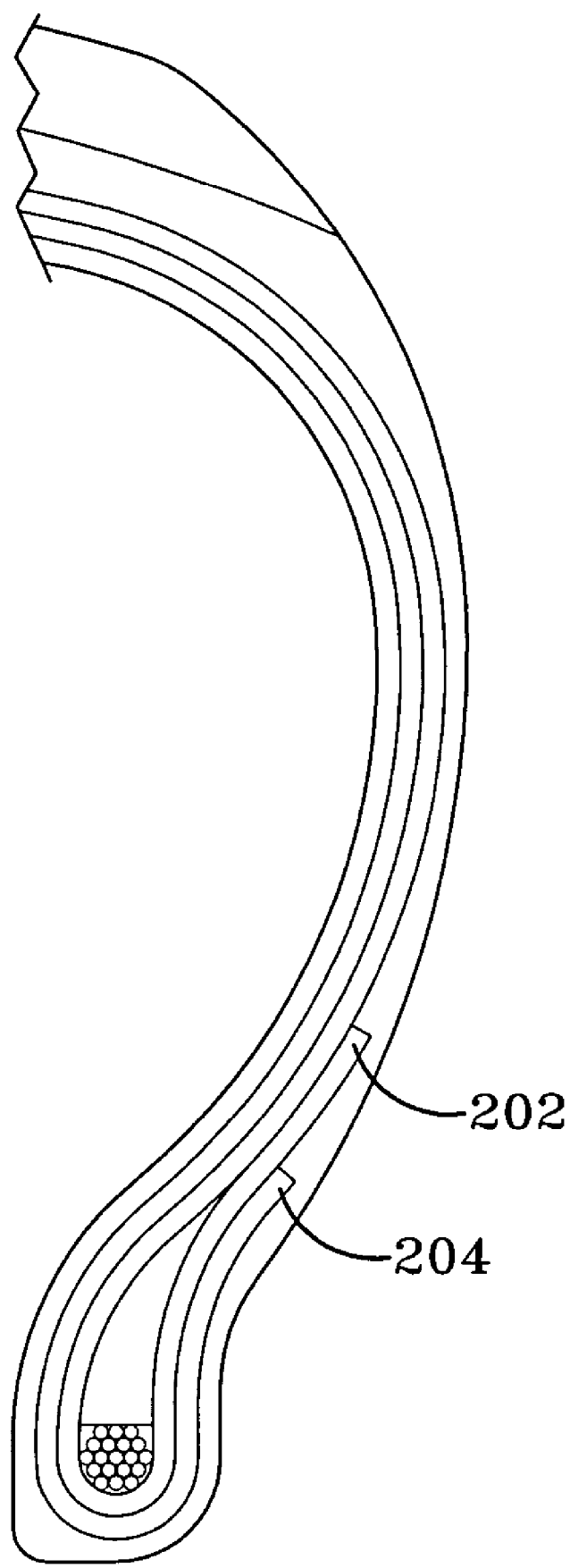

A fifth example of a segment configuration 150 is shown in FIGS. 26*a* and 26*b*. Each segment has a pi width, a length L and a thickness one half of the gauge of the final end product tire ply. The cords run parallel with the length and have half the desired epi of the final tire ply. A first layer 152 of segments is laid up on the conveyor with the lateral edges abutting. A second layer 154 of segments is layered over the first layer, wherein the second layer is offset from the first layer. The second layer may be offset about half the width or W/2. The ends of the ply formed from this segment configuration have flaps which extend that have half the epi and gauge. The flaps may be spliced together as shown in FIG. 26*a*. In this staggered configuration, the first and second layer of cords may be oriented at the same angle such as 90 degrees, or the first and second layer may be oriented at equal but opposite angles, e.g., +88 degrees, −88 degrees. The length of the first and second layers may also be cut to different lengths for staggered endings. As shown in FIG. 27, staggered endings 202, 204 of half the step-off height of traditional turnup endings, reduce stress risers and the potentional to trap air at the ply endings.

After the segments are spliced together on the assembly conveyor into the final ply product, the final ply product is transferred to a false drum conveyor 100. The false drum conveyor is located adjacent the tire building drum and can slide forward on rails. The conveyor can also pivot so that the conveyor edge can orient tangent to the drum surface for applying the final ply product to the drum.

A second embodiment of the invention is partially shown in FIGS. 1-4 and FIG. 25. The second embodiment of the invention is the same as the first embodiment except for the following differences. The calendering system is replaced with a crosshead extruder 200. One example of a crosshead extruder suitable for use is shown in U.S. Pat. No. 4,274,821 which is hereby incorporated by reference in its entirety. Another example of a cross-feed extruder which may be used with the invention is made by Steelastic LLC of Akron, Ohio. Other crosshead extruders may also be used with the invention. In a cross-feed extruder, the cords are pulled through the extruder by drive rollers (not shown). Pressurized rubber or other elastomeric material is fed through via a drive screw which maintains pressure in the head of the extruder. The rubber or elastomer is extruded over the cords and then shaped into the desired gauge and cross section by a die at the exit of the extruder.

Thus the above described methods and apparati of the present invention can make tire ply right at the tire building drum. The machines for making the ply allow for easy changing of ply gauge, cord spacing, cord angle and width. Thus different ply configurations can be made on the fly for each successive tire.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full-intended scope of the invention as defined by the following appended claims.

What is claimed is:

1. An apparatus for making a reinforced elastomeric fabric having a gauge thickness G and a cord density EPI, the apparatus comprising: an adjustable die for varying the cord density without needing to remove the cords from therein, the die comprising a plate having a plurality of angled slots, wherein a single reinforcement cord is received within each slot, a first and second calender roll located adjacent the die, the die having a housing that includes a slot wherein the slot is located in abutting engagement with one of said calender rolls so that the reinforcement cords are pressed into engagement with a ribbon of elastomeric material, the calender rolls being spaced to provide a gauge thickness of about G/2, the apparatus further comprising a cutter for cutting the ribbon of reinforced elastomeric material into segments having a length L, each segment having a width W, each segment having lateral edges, said apparatus further comprising a pick arm for placing a plurality of segments onto a conveyor so that the lateral ends of adjacent segments are lap spliced together, the lap splice having a width W/2.

2. The apparatus of claim 1 wherein the die has adjustable epi spacing of the reinforcement cords.

3. The apparatus of claim 1 wherein the segments have a width of pi/2.

4. The apparatus of claim 1 wherein the segments have a width of pi.

5. The apparatus of claim 1 wherein the segments have a width of 2*pi.

* * * * *